(12) United States Patent
Friend et al.

(10) Patent No.: US 6,262,804 B1
(45) Date of Patent: Jul. 17, 2001

(54) HANDHELD COLOR MEASUREMENT INSTRUMENT

(75) Inventors: Timothy R. Friend, Grandville; Douglas V. Baker, Middleville; Steven H. Peterson, Wyoming, all of MI (US)

(73) Assignee: X-Rite, Incorporated, Grandville, MI (US)

( * ) Notice: Subject to any disclaimer, the term of this patent is extended or adjusted under 35 U.S.C. 154(b) by 0 days.

(21) Appl. No.: 09/570,718

(22) Filed: May 15, 2000

Related U.S. Application Data (60) Provisional application No. 60/180,242, filed on Feb. 4, 2000.

(51) Int. Cl.[7] .................................................. G01J 3/50
(52) U.S. Cl. ......................... 356/402; 356/406; 356/407; 235/462.45
(58) Field of Search ................................ 356/402, 405, 356/406, 407, 72; 235/462.45, 472.01

(56) References Cited

U.S. PATENT DOCUMENTS

| | | |
|---|---|---|
| 4,591,978 | 5/1986 | Peterson et al. . |
| 4,645,350 | 2/1987 | Weidmann et al. . |
| 5,062,714 | 11/1991 | Peterson et al. . |
| 5,118,183 | 6/1992 | Cargill et al. . |
| 5,272,518 | 12/1993 | Vincent . |
| 5,373,364 | 12/1994 | Krzyminski . |
| 5,701,175 | 12/1997 | Kostizak et al. . |
| 5,754,283 | 5/1998 | Keane et al. . |
| 5,825,486 | 10/1998 | Zavislan et al. . |
| 5,963,333 | 10/1999 | Walowit et al. . |
| 5,986,769 | 11/1999 | Krzyminski . |
| 6,147,761 | 11/2000 | Walowit et al. . |

FOREIGN PATENT DOCUMENTS

| | | |
|---|---|---|
| 3723701 | 2/1989 | (DE) . |
| 4318637 | 6/1994 | (DE) . |
| 4305968 | 4/1996 | (DE) . |
| 197 22 073 | 3/1998 | (DE) . |
| 196 33 557 | 5/1998 | (DE) . |
| 197 16 066 | 9/1998 | (DE) . |
| 0171360 | 1/1986 | (EP) . |
| WO0042595 | 7/2000 | (WO) . |

OTHER PUBLICATIONS

X–Rite DTP Series, Auto Scan Densitometer & Colorimeter RCI Manual, 1996.

Primary Examiner—F. L. Evans
(74) Attorney, Agent, or Firm—Warner Norcross & Judd (57) ABSTRACT

The specification discloses a handheld color measurement instrument including a housing adapted to be held by a human hand. A plurality of support rollers support the housing for movement in a linear direction. A color measurement engine is contained within the housing and includes an aperture opening through the bottom of the housing. The housing includes a pair or pairs of elements defining a line parallel to the linear direction and aligned with the aperture to facilitate alignment of the instrument for scanning. The color measurement engine within the housing includes photodetectors on only one side of the aperture, enabling the aperture to be positioned adjacent the nose of the housing. The support rollers are proximate the perimeter of the housing, and an encoder wheel is inward of the support rollers and proximate the aperture. The instrument is capable of reading barcodes, for example for configuring the instrument, and of reading color samples.

16 Claims, 9 Drawing Sheets

HANDHELD COLOR MEASUREMENT INSTRUMENT

PRIORITY CLAIM

This application claims the benefit of U.S. Provisional Application No. 60/180,242 filed Feb. 4, 2000 and entitled "Handheld Color Measurement Instrument."

BACKGROUND OF THE INVENTION

I. Field of the Invention

The present invention relates to color measurement instruments, and more particularly to handheld color measurement instruments.

II. Description of the Art

Color measurement instruments are capable of reading colors for the subsequent conversion of the colors to a mathematical representation. That representation can be processed using techniques known to those skilled in the art to perform color functions. Color measurement instruments include, by way of illustration and not limitation, spectrophotometers, calorimeters, densitometers, and spectroradiometers.

A handheld color measurement instrument is disclosed in U.S. Pat. No. 5,986,769 issued Nov. 16, 1999 to Krzyminski and entitled "Hand-Held Instrument for Reflection Measuring on Printed Sheets and Test Charts." This instrument is used in reading "color bars" on printed sheets. While providing a certain level of convenience and accuracy, this scanner is not without its drawbacks. First, the instrument requires a handheld rule to guide the instrument along a linear path. Second, the instrument appears to include a single photodetector. Third, the space required by the encoder wheel limits the positioning of the support wheels.

SUMMARY OF THE INVENTION

The aforementioned problems are overcome in the present invention wherein a handheld color measurement instrument is provided with improved functionality and ease of use. In all aspects of the invention, the instrument includes support rollers that guide movement of the instrument on a surface in a linear direction. The instrument includes a color measurement engine having an aperture opening through the bottom of the instrument. Consequently, the aperture scans along a line as the instrument is rolled over a surface such as a printed sheet.

In a first aspect of the invention, the instrument housing includes line-defining elements for defining a visual line that is parallel to the linear direction of travel and that is aligned with the scanning aperture. The elements can be one or more of wings on the housing, notches in the housing, or lights supported by the housing. The line-defining elements assist in aligning the instrument with a target for accurate scanning.

In a second aspect of the invention, the instrument is a densitometer including a blunt nose, and the scanning aperture is located proximate the nose. A plurality of photodetectors are arranged in an arcuate configuration about the scanning aperture. No photodetector is closer to the blunt nose than the scanning aperture. Consequently, the photodetectors do not interfere with placement of the aperture closely proximate the blunt nose of the instrument.

In a third aspect of the invention, rolling support elements and an encoder wheel are mounted in the bottom of the instrument. The support wheels are proximate the perimeter of the bottom of the instrument. By separating the rolling support elements from one another as much as possible (i.e. positioning them proximate the perimeter of the bottom), the tracking of the instrument is improved. The encoder wheel is positioned interiorly of the support elements, where room is available for the entire encoder assembly.

In a fourth aspect of the invention, the single color measurement engine within the instrument is capable of reading both bar codes and color bars or other targets. Consequently, the instrument can be used to read barcode information, for example, to configure the instrument. The instrument does not require a separate optical mechanism for reading the bar codes.

These and other objects, advantages, and features of the invention will be more readily understood and appreciated by reference to the detailed description of the preferred embodiment and the drawings.

DETAILED DESCRIPTION OF THE PREFERRED EMBODIMENT

A handheld color measurement instrument constructed in accordance with a preferred embodiment of the invention is illustrated in the drawings and generally designated 10. The instrument includes a housing 12 (FIGS. 1–3) and a color measurement engine or optics assembly 14 (FIGS. 4–7). The housing includes a plurality of rollers 16 (FIGS. 3–5) to support the housing 12 for rolling movement in a linear direction D. The optics assembly 14 includes an aperture 18 opening through the bottom of the housing. When the instrument is rolled across a surface such as a printed sheet, the aperture scans along a linear path such as a color bar B.

The disclosed instrument 10 is a densitometer. Alternatively, the instrument could be any color measurement instrument such as a spectrophotometer or colorimeter.

I. Housing

The housing 12 includes a base plate 20, a heat sink 22, and a cover 24.

The base plate 20 is the frame component on which the remaining elements are supported. In the preferred embodiment, the base plate 20 is fabricated of plastic. Alternatively, the base plate may be fabricated of any suitable material.

The base plate 20 includes an optics socket 30 for the optics assembly, a plurality of roller sockets 32, and an encoder socket 34. The optics socket 30 is configured to receive the optic assembly 14. The roller sockets 32 receive the support rollers 16 in a snap-fit fashion. The rollers 16 are free to rotate within the sockets 32 after being mounted therein. Similarly, the encoder wheel socket 34 receives the encoder wheel 36 in snap-fit fashion. The encoder wheel is also free to rotate after assembly.

The encoder wheel 36 is coupled in conventional fashion to an encoder (not shown) of the type generally well known to those skilled in the art. As perhaps best illustrated in FIG. 3, the wheel 36 is proximate the front rollers 16 and the aperture 18. As used in this context, proximate means that the distance between the wheel 36 and aperture 18 is no more than one-half, and preferably no more than one-third, of the length of the instrument 10. The proximity of the wheel 36 to the aperture 18 improves the correspondence between the distance measured by the encoder and the distance covered by the aperture.

Figures 2, 3:
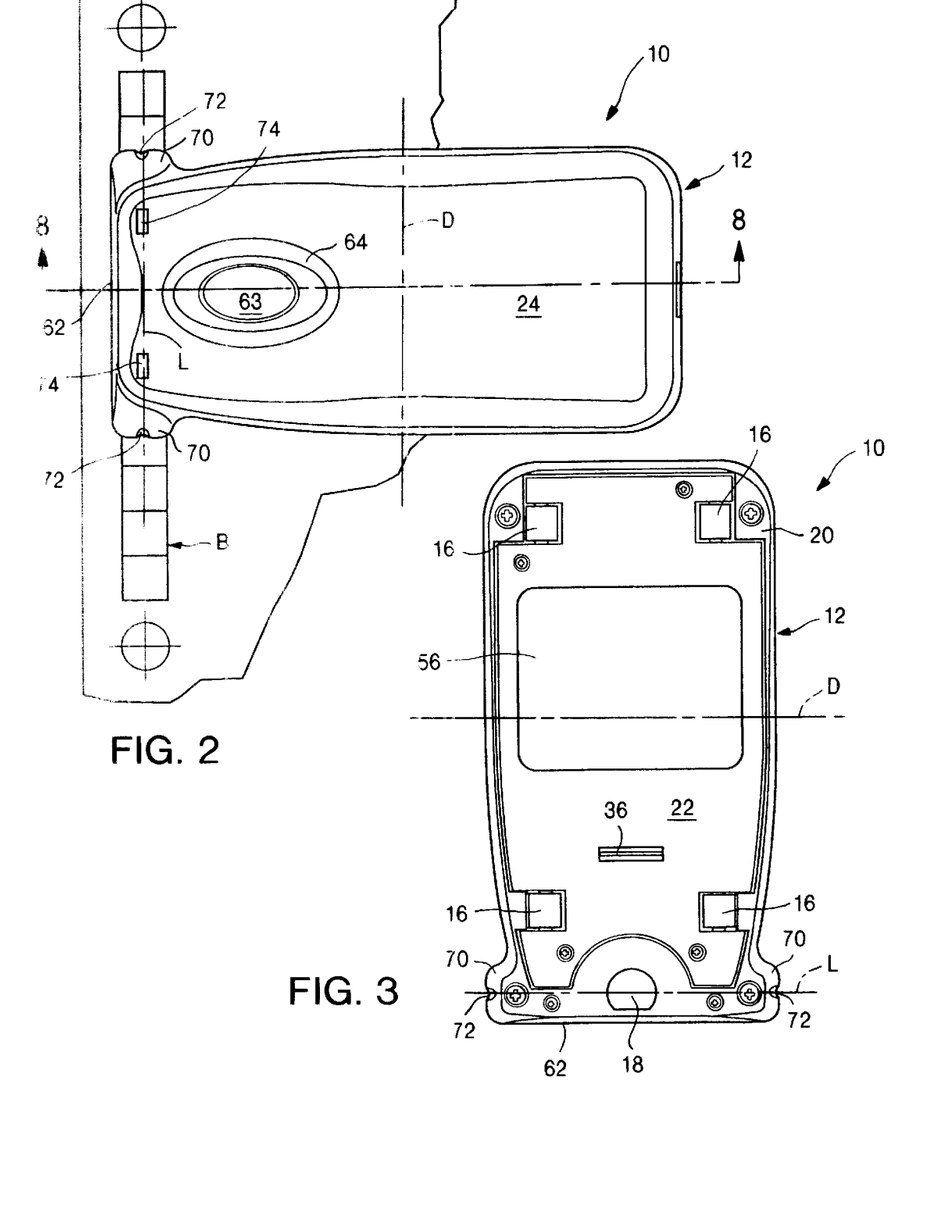
FIG. 2 is a top plan view of the instrument scanning the color bar.
FIG. 3 is a bottom plan view of the instrument.

The base plate 20 further includes front mounting bosses 40 and rear mounting bosses 42 for properly registering and securing the cover 24 to the base plate 20 using fasteners (visible only in FIG. 3). The plate 20 further defines apertures 44 for receiving fasteners (visible only in FIG. 3) intersecuring the heat sink 22 and the optics assembly 14 to provide a thermal path between the optics assembly and the heat sink. The plate 20 further defines apertures 46 for receiving fasteners (visible only in FIG. 3) for securing the heat sink 22 to the bottom of the plate.

As perhaps best illustrated in FIG. 3, the support rollers 16 are located proximate the perimeter of the housing 12 or base 20. The tracking of the instrument is enhanced by positioning the rollers as far apart from one another as possible. This is similar to improving the tracking of an automotive vehicle by having a wide wheel base. The axis of rotation of all of the rollers 16 are parallel to one another. Consequently, the instrument 10 tracks in a linear direction D generally perpendicular to the axes of rotation of the rollers. In the currently preferred embodiment, the rollers 16 on each side of the instrument 10 are substantially co-axial with one another. However, non-co-axial roller placements are also within the scope of the present invention, and may be desirable in view of instrument geometry due to functional and/or decorative considerations.

Figure 4:
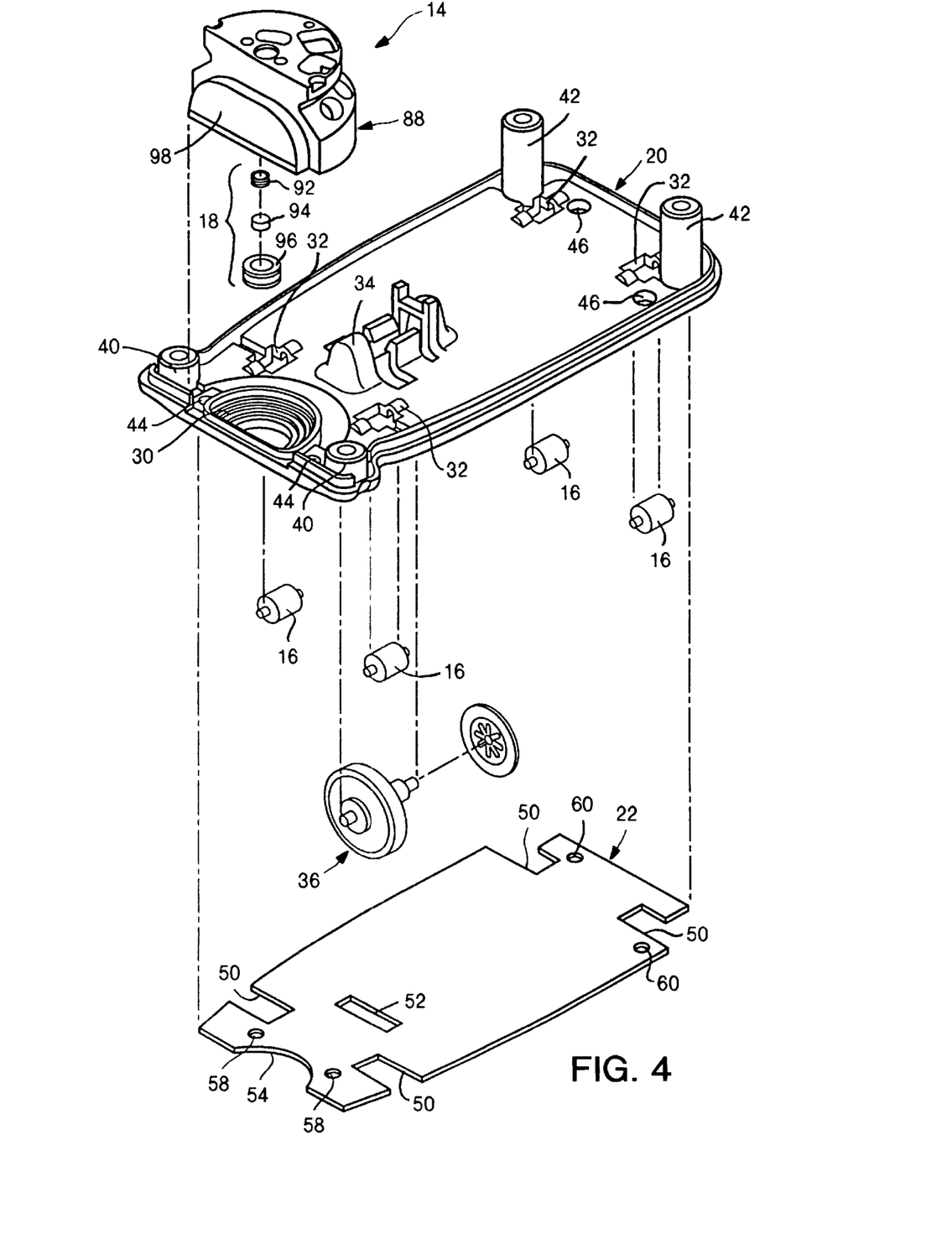
FIG. 4 is an upper perspective exploded view of the instrument with the cover removed.
Figure 5:
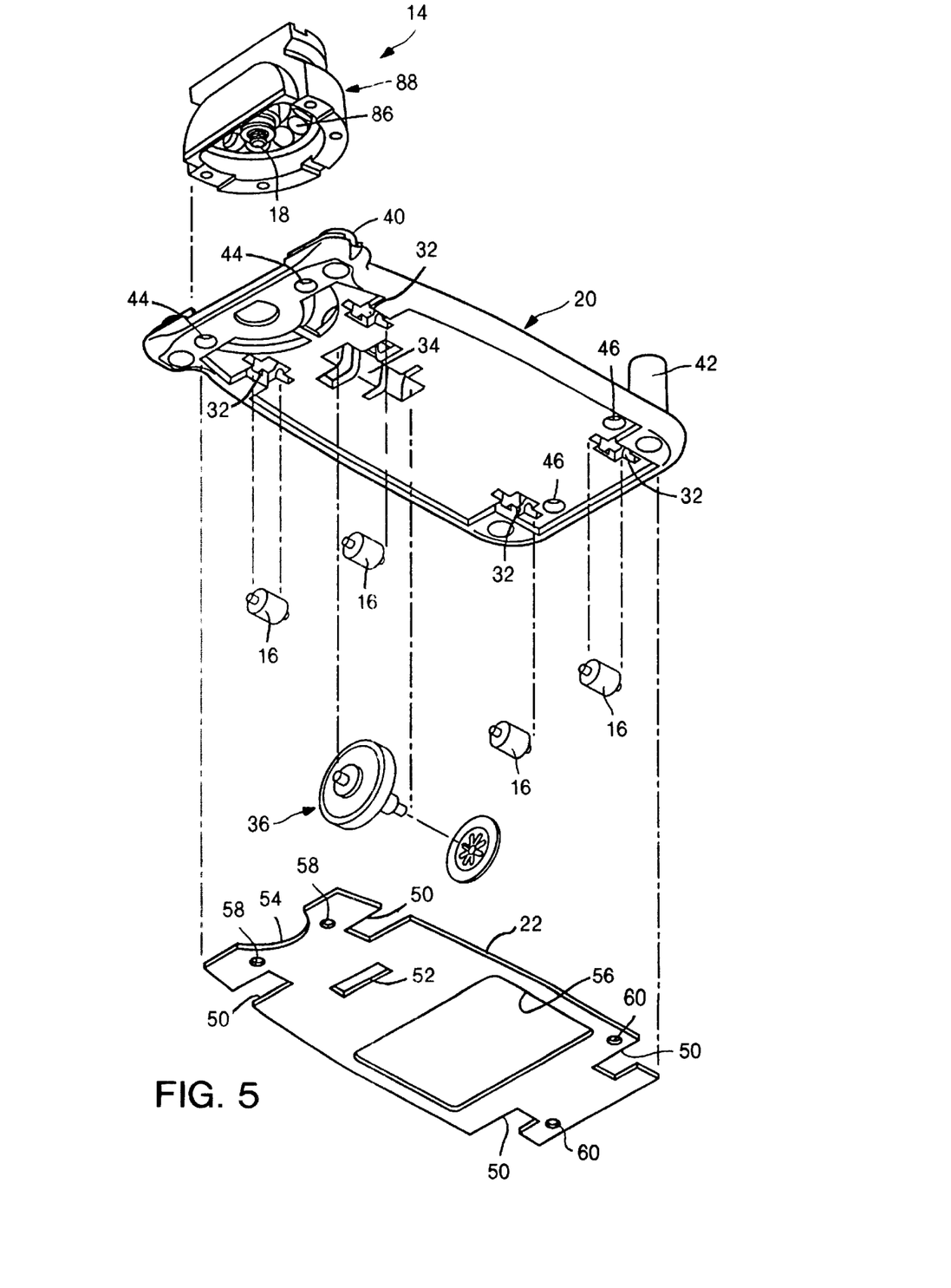
FIG. 5 is a bottom perspective exploded view of the instrument with the cover removed.

The heat sink 22 is included to dissipate heat generated by the optics assembly 14. As seen in FIGS. 3–5, the heat sink 22 is configured to have a perimeter generally similar to the perimeter of the base plate 20. The heat sink 22 includes support wheel cut-outs 50, an encoder wheel cut-out 52, and an optics cut-out 54. The heat sink also includes a label aperture or window 56 permitting viewing of a label mounted in the label area 26 on the base plate 20.

The heat sink 22 further includes front apertures 58 and rear apertures 60. The front apertures 58 are aligned with the apertures 44 in the base plate 20 and the optics assembly 14, so that the heat sink may be secured to the optics assembly 14 to provide a thermal path. The rear apertures 60 are aligned with the apertures 46 in the base plate 20 enabling the heat sink 22 to be attached to the instrument.

Figure 1:
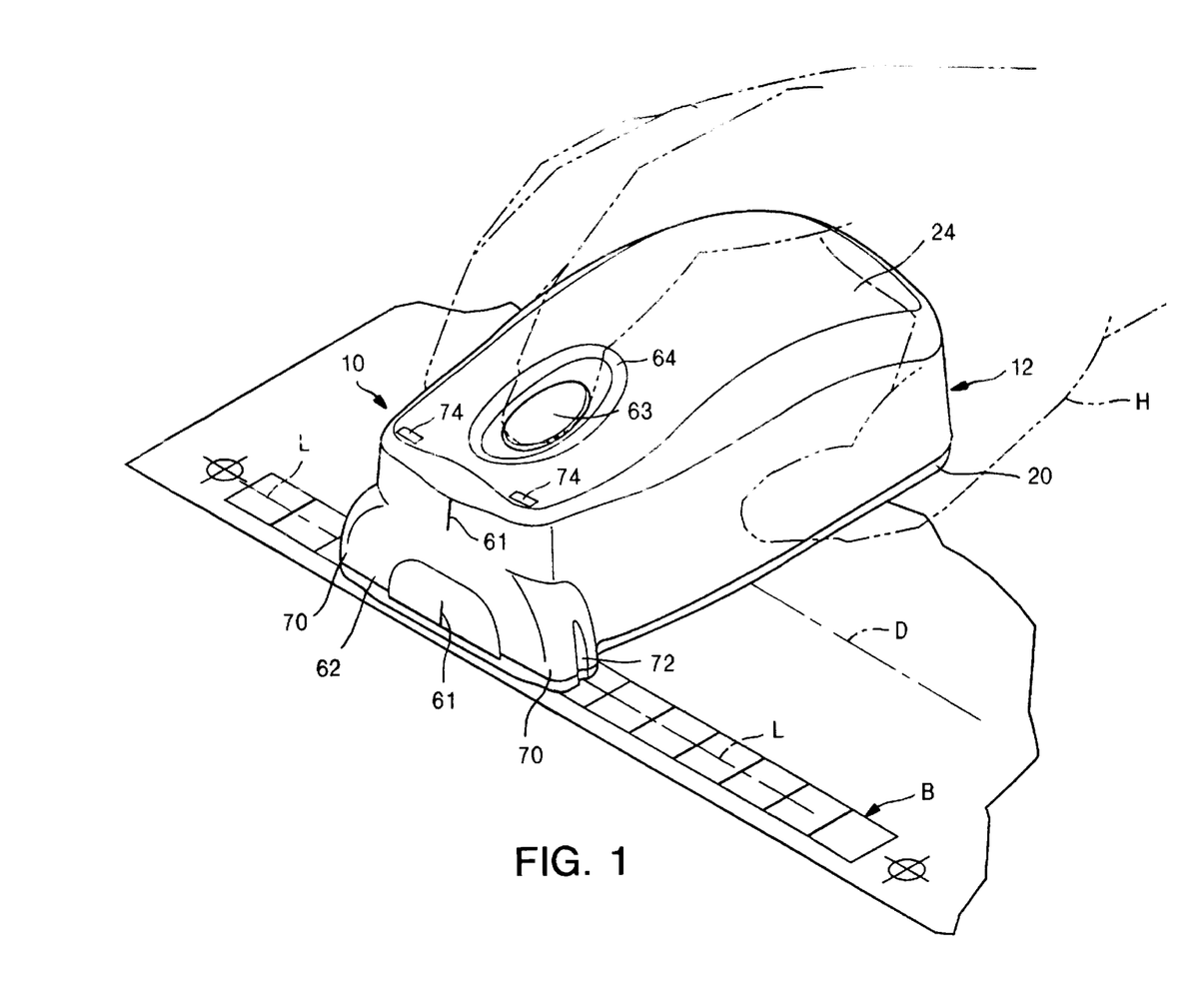
FIG. 1 is a perspective view of the color measurement instrument of the present invention scanning a color bar on a printed sheet.

The cover 24 (FIGS. 1–2) is designed to be easily grasped by a human hand H (FIG. 1). The design of the cover 24 is symmetrical about a longitudinal line. Therefore, the instrument 10 is unhanded. The base of the cover 24 is generally the same shape as the base plate 20 so that the cover and base plate fit neatly together when intersecured. The housing 12, including the base plate 20 and the cover 24, include a blunt nose 62. In the preferred embodiment, the nose is generally linear and planar. However, blunt has generally understood meanings broader than generally linear or planar. One or more lines 61 may be provided on the nose 62 in the form of printing, notching, or other means. Each line 61 is perpendicular to the bottom of the instrument and is aligned with the aperture 18. The lines 61 provide a visual indicator of the position of the aperture 18 to assist in taking "spot" readings (i.e. readings of a single spot without moving the instrument during the reading).

Figure 8:
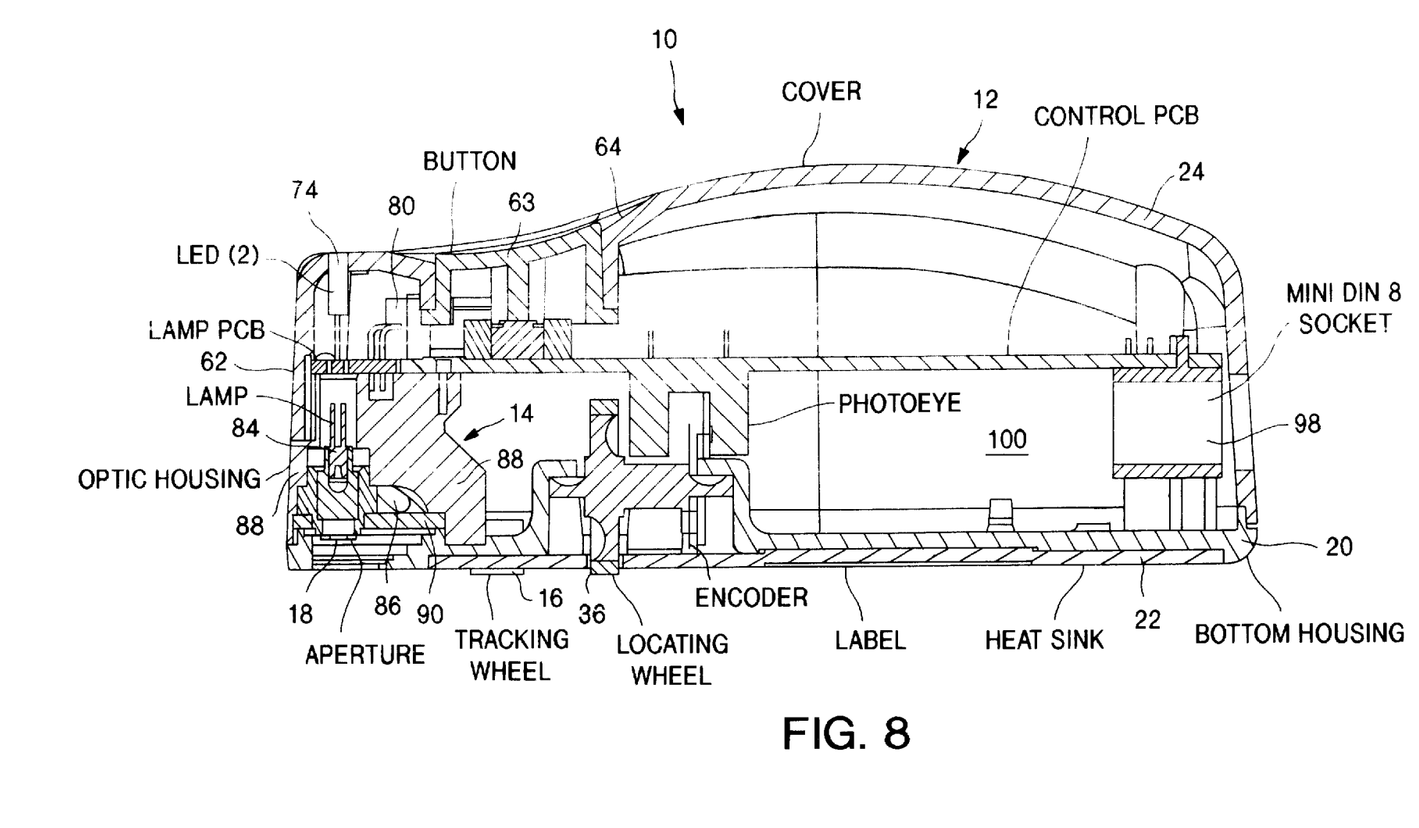
FIG. 8 is a sectional view through the instrument taken along line 8—8 in FIG. 2.

A button 62 (FIGS. 1 and 8) is located within a button recess 64 to be easily operated by the index finger (or another finger) of the operator. The button 62 is electrically connected to the internal circuitry or processor of the instrument 10.

The housing 12 includes several pairs of line-defining elements or means for visually defining lines that are parallel to the linear direction of travel and that are aligned with the aperture 18. With particular reference to FIGS. 1 and 2, these line-defining means include any one of the pair of wings 70, the pair of notches 72, or the pair of light-emitting diodes (LEDs) 74. Each of these pairs defines a line L parallel to the direction of travel D and aligned with the aperture 18. Consequently, the pairs of line-defining elements enable the operator to visually align the instrument 10 for linear scanning along a color bar B or other color target.

II. Optics Assembly

Figure 7:
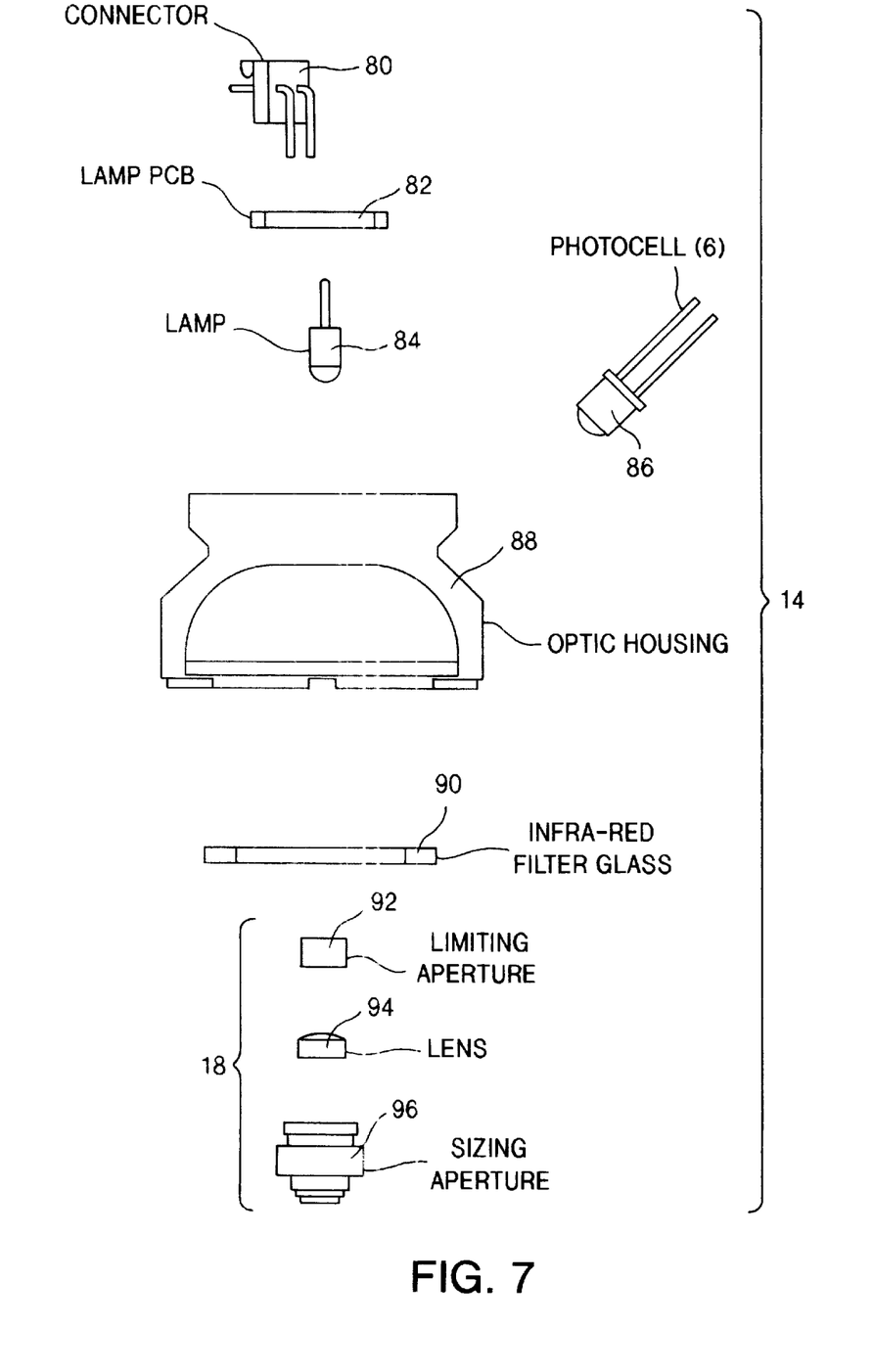
FIG. 7 is a side exploded view of the optics assembly.

The optics assembly or color measurement engine 14 includes (from top to bottom as illustrated in FIG. 7) a connector 80, a lamp printed circuit board (PCB) 82, a lamp 84, a plurality of photocells or photodetectors 86, a housing 88, an infrared filter 90, a limiting aperture 92, a lens 94, and a sizing aperture 96. The last three elements are collectively referred to as the aperture or aperture assembly 18.

Figure 6:
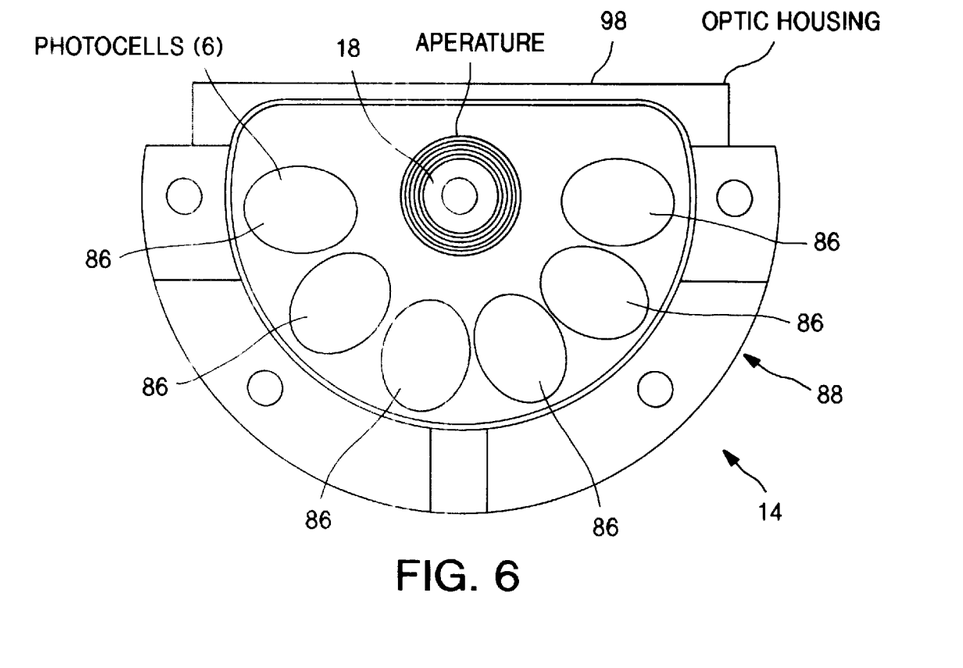
FIG. 6 is a bottom view of the optics assembly.

The housing 88 is D-shaped (see FIG. 6). The D shape includes a flat surface 98 which abuts the blunt nose 62 of the housing 12 within the assembled instrument. This enables the optics assembly 14 to be positioned as far forward within the housing 12 as possible while still providing a plurality of photodetectors 86 in the assembly.

The infrared filter glass 90 is well known to those skilled in the art and is included to block infrared (IR) radiation from reaching the photocells 86. All of the elements within the aperture or aperture assembly 18 also are generally known to those skilled in the art.

Both the lamp 84 and the connector 80 are mounted on the PCB 82 in conventional fashion. The lamp or illuminator is generally known to those skilled in the art and in the preferred embodiment is a tungsten/halogen (i.e. tungsten filament and halogen gas) lamp.

The photocells 86 are mounted in a semicircular configuration about the aperture 18. Because the instrument is a densitometer, the photocells are selected to be sensitive to one of the colors of cyan, magenta, and yellow to provide an ANSI/ISO Status T system response. A pair of photocells responsive to each color are arranged at 90° to one another. This approach enhances (over a single photocell) the accuracy and averaging of detected color by increasing the signal and by reducing orientation variation due to, for example, the grain of the media. Other responses and detector configurations are within the scope of the invention.

The instrument 10 also includes a computer processor or other processing means for controlling the operation of the instrument and for interfacing the instrument with a computer. The processor is generally known to those skilled in the art, and therefore need not be illustrated or described in this application. The processor would be located in the area 100 (see FIG. 8) and would include appropriate electrical connections such as to the interface socket 98. The instrument 10 may include both USB (Universal Serial Bus) and serial (e.g. RS232) capability, for example, as disclosed in U.S. patent application Ser. No. 09/411,484 filed Oct. 1, 1999 and entitled "Color Measurement Instrument with Multiple Protocol Interface".

III. Operation

The instrument 10 is easily used as a hand-held color measurement device. A cord (not illustrated) interconnects the instrument 10 with a personal computer or other device. Specifically, the cord is connected to the instrument 10 via the socket 98.

To scan a color bar, the instrument is grasped with the hand much as a computer mouse would be. The instrument is positioned so as to be aligned for linear scanning across a color bar B. All of the line-defining elements facilitate the proper alignment of the instrument 10 with the color bar B. As noted above, those devices include the wings 70, the notches 72, and the LEDs 74. The user then depresses the button 62 and rolls the instrument 10 along the color bar B. When scanning is complete, the user releases button 62. Because the rollers 16 guide the instrument 10 along a linear path D, the instrument 10 tracks along the color bar if properly initially aligned. Only minimal, if any, corrective guidance is required by the user when scanning the color bar B.

The densitometric operation of the instrument 10 is well known to those skilled in the art. Consequently, a detailed description is not necessary. Suffice it to say that the photocells 86 detect the light reflected from various locations along the color bar so that the processor (not illustrated) can convert the photodetector outputs into a mathematical representation of the scanned color.

The instrument 10 can also be configured, reconfigured, or otherwise programmed using barcode information. In doing so, a bar code set-up sheet or sheets (not illustrated) are provided by the manufacturer of the instrument. The sheet or sheets include custom barcode information for configuring the parameters, including but not limited to the following:

Baud Rate

Separator (the character that appears between the data fields)

Delimiter (the character that indicates the end of a line)

Decimal point (can be turned on or off)

Auto Transmit (data automatically transmitted after a measurement is complete)

Data After Pass (transmits data after each pass [as opposed to collecting all data And transmitting only when all passes have been measured])

Min/Max (includes Min/Max information for selected strip data)

Times-10 (adds extra digit of precision to measured data)

Instrument Type

Turning more specifically to the configuration of the instrument using bar codes, the following description is provided.

The barcode system comprises a specially designed barcode format which is printed on the sample to be measured by the pattern recognition firmware. This system uses existing densitometer optics for reading the barcodes, eliminating the need for additional barcode reader hardware. The barcodes are imaged in the measurement path, allowing the instrument 10 to measure the color patches and read the barcode with a single pass. The internal pattern recognition algorithms distinguish between the sample area and the barcode area, and handle each appropriately.

These barcodes have a number of uses, including but not limited to the following:

1) Instrument calibration:

The calibration values may be encoded on the calibration strip along with the patches to be measured. This allows the user to calibrate the unit with a single pass without having to enter calibration values manually.

2) Strip identification:

Barcodes may be imaged along with the color patches to be measured. This allows strips to be tagged with an identifier code. This code can be used for lot or batch identification, verification of the correct strip, or any other use which could use a small amount of information along with the measured color data.

3) Unit configuration:

A barcode or series of barcodes may be set up to allow the instrument to be configured without requiring the use of external computers and software. The firmware in the instrument is configured to recognize certain sequences of barcodes. These sequences may then correspond to internal configuration settings. Moving the unit over the properly sequenced barcode causes it to change its internal configuration to match the desired settings encoded into the barcode. The set of configuration barcodes can be printed in a user manual along with text describing each barcode's function.

Because these barcodes are read with the same optics used to measure the color patches and not with a dedicated barcode reader, their format differs greatly from any of the established bar coding methods (such as used on UPC symbols). The method minimizes the amount of linear space required for 8 bits of information while allowing for differing media contrast ratios and varying strip travel speeds. The measurements given are optimized for the size of the aperture in the optics and the range of travel speeds with which the barcodes are measured. Although this description specifies using black and white to encode the barcodes, and because the instrument measures the three color channels simultaneously, the methods described herein can readily be extended to use different colors to increase the amount of encoded information.

The basic barcode format is as follows: 1 start bit, 8 data bits encoded least significant bit first (nearest the start bit), and 1 stop bit. The barcode is scanned in the direction such that the start bit is the first end to be read. Logic 1 is defined as a black area or area of maximum density. Logic 0 is defined as a white area or area of minimum density. It is important that the density of the logic 1 patches be as close as possible to the maximum density (D-Max) found anywhere along the read path and that the density of logic 0 be as close as possible to the minimum density (D-Min) found anywhere along the read path. Anything other than D-Max or D-Min may render the barcode unrecognizable.

The start bit is 0.4 inches (10 mm) in length and is composed of 0.1 inches (2.5 mm) of D-Min followed by 0.3 inches (7.5 mm) of D-Max.

Figure 9:
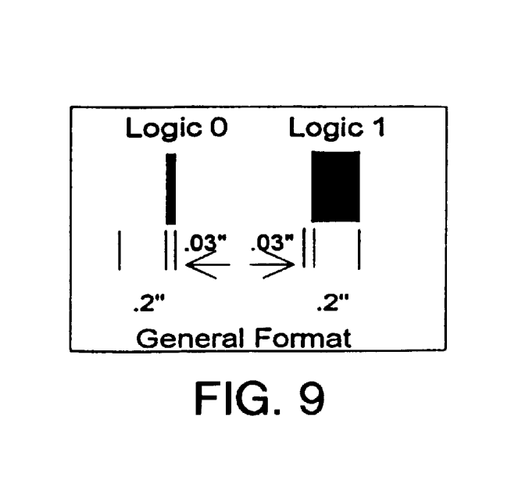
FIGS. 9–13 illustrate acceptable and unacceptable bar code for use in conjunction with the instrument.
Figure 10:
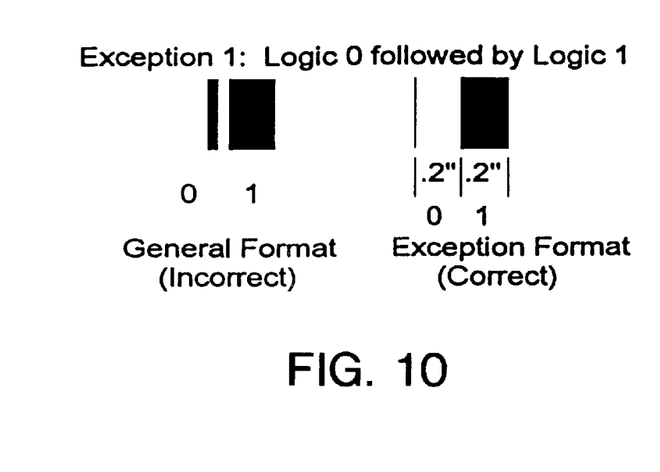

Each data bit is 0.2 inches (5 mm) in length. Bits are encoded in a modified Manchester format, where each bit is composed of a D-Min area followed by a D-Max area. The state of an individual bit is determined by the ratio of the length measurements of D-Min to D-Max, where a bit composed of mostly D-Min area is considered Logic 0 and a bit composed of mostly D-Max area is considered Logic 1. To minimize the number of light/dark transitions and to maximize the size of each bit, the D-Min/D-Max ratio will depend on the state of the surrounding bits. In general, Logic 0 is 0.17 inches (4.3 mm) of D-Min area followed by 0.03 inches (0.8 mm) of D-Max. Logic 1 is 0.03 inches (0.8 mm) of D-Min followed by 0.17 inches of D-Max. Exceptions to the above general rule are as follows:

If the current bit is Logic 0 and the next bit is Logic 1, the D-Max area which would have been normally a part of the current bit is omitted and the D-Min area which would have been a part of the next bit is omitted (see FIGS. 9–10).

Figure 11:
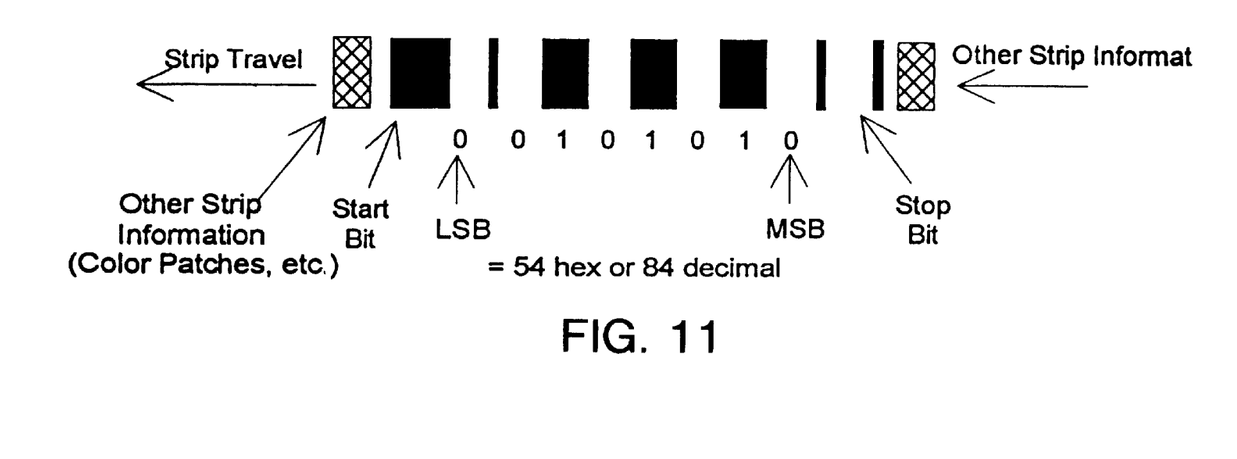

Stop Bit:

The stop bit shall be a Logic 0 bit conforming to the general specification for a data bit. The D-Max portion of this bit may be a part of surrounding D-Max area. An example of an appropriate barcode according to the described format is illustrated in FIG. 11.

Figure 12:
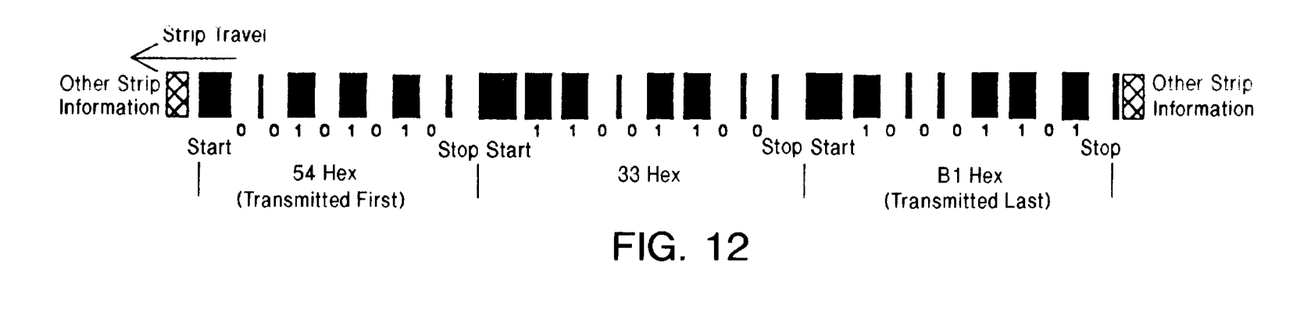

If two or more barcodes are placed end to end, the stop bit of the first barcode may be partially overlaid by the start bit of the second barcode such that white-to-dark transition in both of these bits are lined up. For example, FIG. 12 illustrates three barcodes placed end to end.

Figure 13:
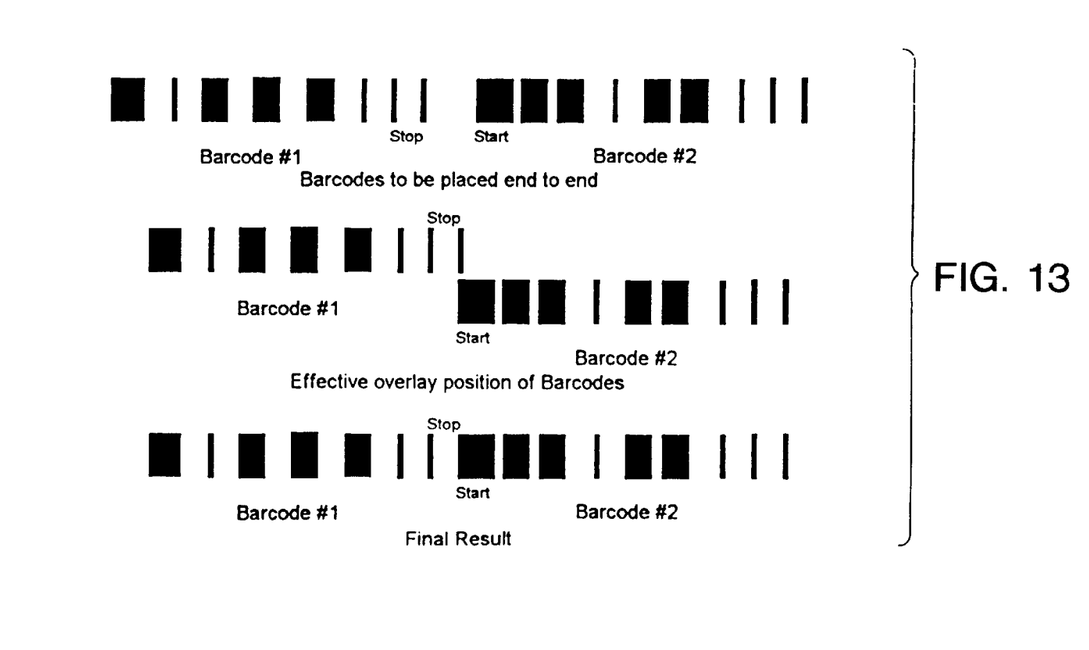

Finally, FIG. 13 illustrates the combining of start and stop bits of two or more barcodes.

Measurement of the barcodes is performed using the optics assembly 18 of the instrument 10. The proportional electrical signal from the photodiodes 86 is amplified and converted to binary representations by an analog to digital (A/D) converter. These binary values are stored in memory for use in the pattern recognition process. As the sample is measured, the A/D values are continuously accumulated in memory until the measurement is complete. The result is a buffer full of binary values representative of the reflected light across the sample. A mechanical distance feedback mechanism such as the rotary encoder enhances the recognition process for wide travel speed variations, but is not necessary because each bit in the barcode has a well-defined transition on both sides.

After a sample set of A/D values has been accumulated in memory, the barcode recognition process begins. For black and white barcodes, only the magenta channel is used; the data from the cyan and yellow channels are discarded. This method could however be extended to allow use of the cyan and yellow data, along with colored barcodes, to encode three times the amount of data in the same physical printed area. The method could be further extended to allow the use of combinations colors to further increase the amount of encoded information in the same physical printed area. The methods will be the same; therefore this description will concentrate only on the use of black and white barcodes.

The first step of recognition is to characterize the data. The data is searched for the value of highest reflectance and the value of lowest reflectance. Once these limits are established, two thresholds are computed, one at 20% of the maximum value, and one at 80% of the maximum value. These thresholds may vary and are set largely by the ratio of the aperture size to the size of the transition bar between two similarly valued bits in the barcode. Any A/D values less than the 20% threshold are considered logic 1 (this is low reflectance, or black), and any A/D values greater than the 80% threshold are considered logic 0 (this is high reflectance, or white). Anything between these two thresholds is considered transitional.

The next step is to scan through the entire sample set and search for the barcode patterns. This step is composed of several sub-steps. The first sub-step is to search for the start bit. This is defined simply as a given number of contiguous A/D values all being logic 1. If linear distance information is available, then the start bit is defined as a linear distance of A/D values, all being logic 1.

Once a valid start bit is found, the next sub-step is to locate 8 bits of data. The first data bit should appear immediately after the start bit, with very few transitional A/D values in between. The data bit is defined in the same manner as the start bit, but with fewer defined A/D values because of the correspondingly smaller size than the start bit. Here, logic 0 or logic 1 are allowed. Each subsequent data bit should appear with very few intervening transitional A/D samples after the prior bit. As each bit is found, its value is recorded for later use.

The last sub-step is to locate the stop-bit. This bit is defined as a data bit whose value is zero. The stop bit serves to frame the 8-bits of data properly.

If there is a failure in any one of the above sub-steps, the entire algorithm is reset, and the search for the start bit re-commences at the current A/D buffer position. Any recorded bit values are ignored. Once an entire byte is recognized, its value is stored, the algorithm is reset, and the search for the start bit re-commences as the current A/D buffer position. These steps stop once the end of data is reached.

The last major step is to use the data just acquired. The data may be used internally if it fits a defined pattern, or it may be transmitted to a host computer along with any measured strip data. In this case, it is up to the host computer to determine the purpose of the data.

The above description is that of a preferred embodiment of the invention. Various changes and alterations can be made without departing from the spirit and broader aspects of the invention, which are to be interpreted in accordance with the principles of patent law, including the doctrine of equivalents.

The embodiments of the invention in which an exclusive property or privilege is claimed are defined as follows:

1. A handheld color measurement instrument comprising:
   a housing having a bottom;
   wheel means for supporting said housing for rolling movement in a linear direction;
   a color measurement engine within said housing and having an aperture through said bottom; and
   line definition means on said housing for defining a line parallel to said linear direction and aligned with said aperture.

2. A handheld color measurement instrument as defined in claim 1 wherein said line definition means comprises said housing including a pair of wings extending from the remainder of said housing.

3. A handheld color measurement instrument as defined in claim 1 wherein said line definition means comprises said housing defining a pair of notches.

4. A handheld color measurement instrument as defined in claim 1 wherein said line definition means comprises a pair of lights supported by said housing.

5. A handheld color measurement instrument comprising:
   a housing adapted to be grasped by a human hand, said housing having a bottom;
   an optical assembly within said housing and having an aperture through said bottom of said housing;
   means within said bottom for supporting said housing for movement in a linear direction only; and
   line definition means on said housing for visually defining a line extending through said aperture and parallel to said linear direction, whereby said line definition means can be used in aligning said aperture with a target so that said aperture can be accurately moved over the target.

6. A handheld color measurement instrument as defined in claim 5 wherein said line definition means comprises a pair of lights supported by said housing.

7. A handheld color measurement instrument as defined in claim 5 wherein said line definition means comprises said housing defining a pair of notches.

8. A handheld color measurement instrument as defined in claim 5 wherein said line definition means comprises said housing including a pair of wings extending from the remainder of said housing.

9. A handheld color measurement instrument comprising:

a housing have a blunt nose and a bottom;

a color measurement engine within said housing and having an aperture extending through said bottom proximate said blunt nose, said engine having a plurality of photodetectors arranged in an arc of 180 degrees or less around said aperture, the distance between any one of said photodetectors and said blunt nose being the same or greater than the distance between said aperture and said blunt nose.

10. A handheld color measurement instrument comprising:

a housing adapted to be grasped by a human hand, said housing have a blunt nose and a bottom;

a color measurement engine within said housing and including an aperture opening through said bottom and proximate said blunt nose, said engine further including a plurality of photodetectors arranged about said aperture, each of said photodetectors being at least as far from said blunt nose as said aperture is from said blunt nose.

11. A handheld color measurement instrument comprising:

a housing have a bottom having a perimeter;

a color measurement engine within said housing and having an aperture through said bottom;

at least four rolling elements within said bottom for supporting said housing for rolling movement on a surface, all of said rolling elements being proximate said perimeter of said bottom; and an encoder wheel within said bottom, said encoder wheel being interior of any of said rolling elements, said encoder wheel being proximate said aperture.

12. A handheld color measurement instrument comprising:

a housing;

means for supporting said housing for movement over a surface having at least one of a barcode and a color target;

a single color measurement engine within said housing for detecting light reflected by barcodes and color targets on the surface; and processing means within said housing for processing the signals generated by said single color measurement engine as said instrument is moved over the surface, said processing means being capable of reading a barcode and generating signals indicative of the information content of the barcode, said processing means further being capable of and reading a color target and generating signals indicative of the color content of the target.

13. A handheld color measurement instrument as defined in claim 12 wherein said processing means is further capable of reading different bar codes of different colors or combinations of colors.

14. A handheld color measurement instrument comprising:

a housing;

a single color measurement engine within said housing;

means for supporting said housing for movement over a surface; and processing means connected to said single color measurement engine for reading and decoding a barcode and for reading a color sample and generating color information related to the color sample.

15. A handheld color measurement instrument as defined in claim 14 wherein said processing means is for reading and decoding different bar codes of different colors or combinations of colors.

16. A handheld color measurement instrument as defined in claim 14 wherein said instrument further comprises:

roller means for rotatably supporting said housing for movement in a linear direction only; and line definition means for defining a line parallel to the linear direction and aligned with the color measurement engine, whereby said line definition means facilitates alignment of said instrument with a target to be scanned.

* * * * *